Sept. 22, 1970     D. H. GRANGAARD     3,529,997

POROUS ELECTRODE FOR THE PRODUCTION OF PEROXIDE SOLUTIONS

Original Filed Dec. 27, 1966

United States Patent Office

3,529,997
Patented Sept. 22, 1970

3,529,997
POROUS ELECTRODE FOR THE PRODUCTION
OF PEROXIDE SOLUTIONS
Donald H. Grangaard, Appleton, Wis., assignor to Kimberly-Clark Corporation, Neenah, Wis., a corporation of Delaware
Original application Dec. 27, 1966, Ser. No. 604,686. Divided and this application Mar. 17, 1969, Ser. No. 807,817
Int. Cl. C01b 15/02; B01k 1/00
U.S. Cl. 117—228                           3 Claims

ABSTRACT OF THE DISCLOSURE

An electrode for use in the electrochemical reduction of oxygen as a cathode being a porous electrically conductive body provided with an impregnant of a redox resin. A process using the noted electrode and involving in the production of peroxide the substantially simultaneous oxidation and reduction of a redox resin, the reduction being by means of electrical current action.

---

This application is a division of copending application Ser. No. 604,686 filed Dec. 27, 1966 now Pat. No. 3,464,477.

BACKGROUND OF THE INVENTION

Field of the invention

This invention relates to a process for the electrochemical production of solutions of hydrogen peroxide satisfactory for the bleaching of cellulosic fibers, and to a new electrode structure having utility in the process.

Relation of the invention and the prior art

Redox systems for the production of hydrogen peroxide are known in the art. Such involve, for example, the filtering of solutions containing oxygen through high molecular weight redox materials. This present invention involves the oxidation of a resin of the redox type while the resin is at substantially the same time reduced electrochemically. This approach to the attainment of peroxides has the advantage that the oxidation and reduction of the redox resin system is literally carried out in a single step. Such is of particular advantage in instances wherein it is desired to carry out the production of a peroxide on a continuous basis. Further, since the peroxide forming reaction is a chemical rather than a catalytic reaction, it is not as critical to wetting as are those reactions where a strictly contact type of catalyst is used, for example, activated carbon.

It is a primary object of this invention to provide a novel electrode structure having particular utility as a cathode for use in an electrochemical process for the production of oxygen containing compounds, for example, hydrogen peroxide.

SUMMARY OF THE INVENTION

Basically, I have found that a resin of the redox type, that is, a resin containing in its molecule a recurring unit of hydroquinoidal structure, may be incorporated with the cathode and thus act as a sort of catalyst for the production of hydrogen peroxide through the electrochemical reduction of oxygen. Further, I have found that the surface of a porous graphite base in the form of a plate or cylinder or other suitable electrically conductive porous base (i.e. sintered nickel plate) can be impregnated with a resin of the redox type, and used as the cathode for the electrochemical reduction of oxygen. The porosity of the base when impregnated, I have found, is thoroughly satisfactory for the passage of oxygen containing gases.

Importantly, the new electrode is capable of extended service, is of relatively low cost, and, rather surprisingly, the composite electrode has good electrical conductivity characteristics.

Figure 1:
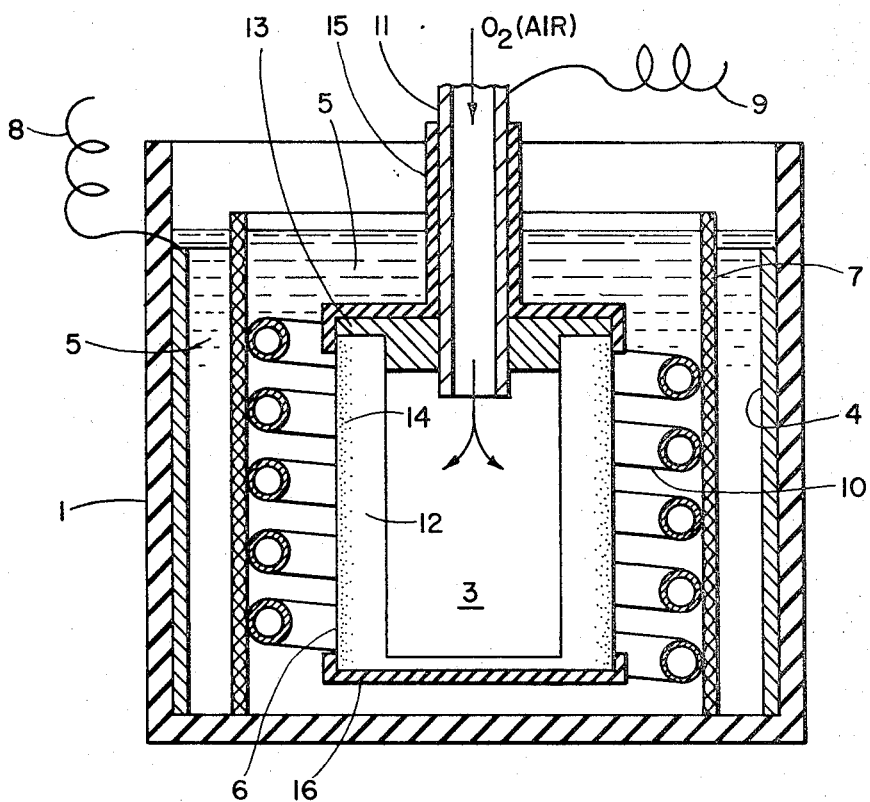
Figure 2:
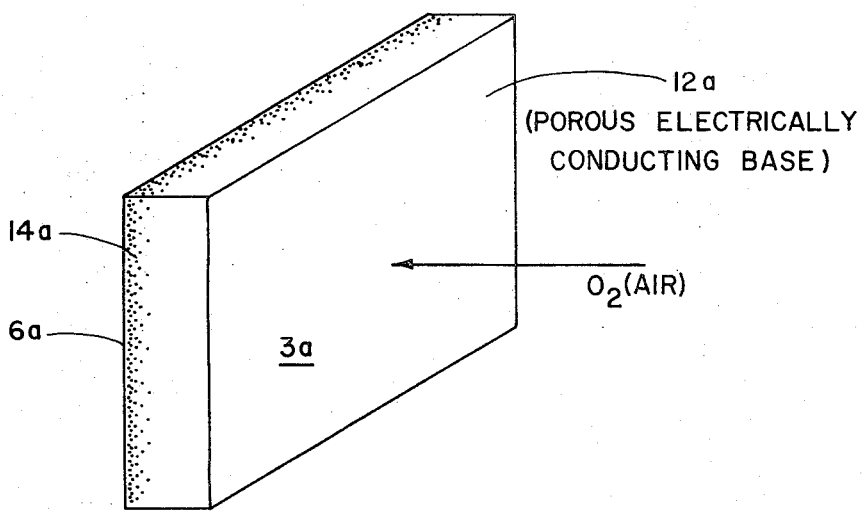

The invention will be more fully understood by reference to the following detailed description and accompanying drawings wherein:

FIG. 1 is an elevational view partly in section diagrammatically illustrating a system for the preparation of hydrogen peroxide and utilizing in accordance with the invention a particular form of cathode; and FIG. 2 is a view of a planar cathode illustrating a further modification of the structure of the invention.

DESCRIPTION OF THE PREFERRED EMBODIMENTS

Referring to the drawings, the numeral 1 in FIG. 1 designates a cell in the shape of a right circular cylinder of electrically insulating material. A cell of the general arrangement shown in FIG. 1 has long been known and is illustrated, for example, in United States Pat. No. 2,000,815. A prime difference between the structure of that patent and that of FIG. 1 is the nature of the impregnant of the cathode.

As shown in FIG. 1, the cell includes a cathode structure 3 disposed centrally and a surrounding anode 4 supported on the interior of the cell 1. An electrolyte 5 (aqueous 2% sodium hydroxide) is retained by the cell between the anode and the cathode exterior surface 6. The anode and cathode are separated by a cylindrical diaphragm 7 which is of asbestos sheet material. Electrical leads 8, 9 to the anode and cathode respectively provide for supplying energy to the system. A cooling coil designated at 10 may be employed if desired but such is not generally necessary.

The cathode 3 is of generally cylindrical shape and includes a lead-in conduit 11 for carrying oxygen or oxygen-containing gases to the cathode interior and thence to the cathode exterior face 6 through the porous body 12 of the cathode. Conduit 11 and body 12 are electrically conductive although only the surface or face 6 of the cathode is impregnated as now noted more particularly.

As shown in FIG. 2, the electrode may conveniently be of a planar shape; in FIG. 2 the body 12a of cathode 3a is partially impregnated with a redox resin 14a just as the cathode 3 is impregnated with redox resin 14 in a manner now described.

The cathode body is of porous graphite and of itself will pass the necessary oxygen containing gas constituent. The impregnant is for the purpose of effecting the production of hydrogen peroxide at or adjacent the surface and as provided does not interfere seriously with the passage of the gas from the interior (or the back face, FIG. 2) to the front surface of the cathode.

In a specific application, hydroquinone to the extent of about 22 parts by weight is blended with phenol to the extent of 1.9 parts and aqueous (37%) formaldehyde to the extent of 32 parts. 0.3 part by weight of sodium hydroxide in the form of a 6% aqueous solution is now added, and the mixture refluxed for about ½ hour to effect the reaction. The somewhat viscous reaction mixture is cooled and diluted by the addition of about 32 parts by weight of alcohol.

The surface of a graphite electrode of cylindrical (or flat) shape is then impregnated with the diluted product. The impregnation may be carried out by simply painting or spraying the resin onto the outer surface of the electrode. Alternatively, the electrode may be dipped into the dilute solution of the resin. The electrode is then air dried to eliminate the solvent and then baked for 18 hours at about 105° C. to cure the resin.

The cathode thus produced was utilized in the manner illustrated in FIG. 1. The oxygen, upon coming in contact with the redox resin, oxidizes the resin to the quinone form, with the simultaneous production of hydrogen peroxide, viz.

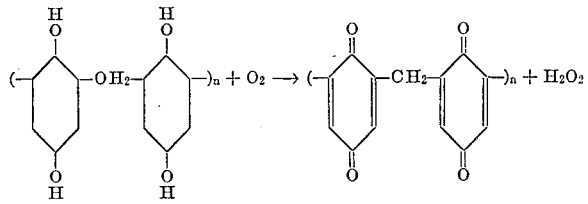

Simultaneously, the resin is reduced electrochemically to the hydroquinone form, viz.

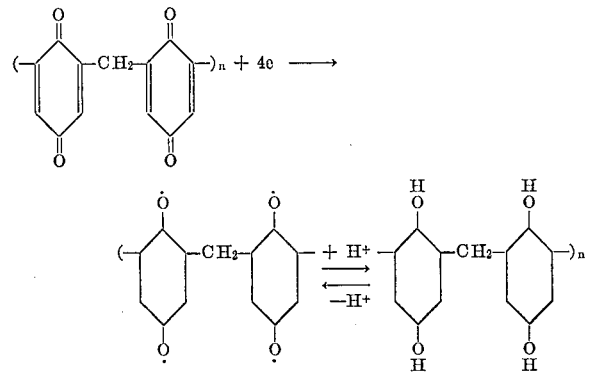

This reaction is effective to provide for the production of the peroxide on a substantial basis.

In a typical example using a cell of the type shown in FIG. 1, wherein the volume of electrolyte (i.e. 1% KOH) in the cathode chamber was about 1000 cc., a solution having a peroxide concentration of 0.918 g./liter was formed in a period of time of one hour. The temperature was room or ambient temperature (about 70° F.) The applied voltage was 16 volts and the current passed was 6 amps. The supplying of the oxygen-containing gas in the form of air (or the more expensive oxygen) results in the production of perhydroxyl ions by the substantially simultaneous oxidation and reduction of the resin. The reduction takes place electrically almost immediately following oxidation in contrast to those procedures of the art which require a chemical additive to effect the reduction step, and involve a very definite time interval.

Other redox resins which serve the purpose include: condensation products of hydroquinone or catechol, pyrogallol, 1, 2, 4 trihydroxy benzene and the like with formaldehyde or compounds of the styrene divinyl benzene type. Such resins in and of themselves are known and characterized by containing recurring units of hydroquinoidal structure.

The term "consisting essentially of" is used herein in the definition of the components to indicate those components whose presence is essential and, as used, it is intended to exclude the presence of other materials in such amounts as to interfere substantially with the properties and characteristics possessed by the composition set forth but to permit the presence of other materials in such amounts as not substantially to affect said properties and characteristics adversely.

As many apparently widely different embodiments of this invention may be made without departing from the spirit and scope thereof, it is to be understood that I do not limit myself to the specific embodiments thereof except as defined in the appended claims.

I claim:
1. An electrode for use in the electrochemical reduction of oxygen, said electrode consisting essentially of an electrically conductive base having an impregnation of a resin containing in its molecule recurring units of hydroquinoidal structure, the said resin and base being pervious to passage of gases.
2. An electrode according to claim 1 wherein the redox resin is a condensation product of hydroquinone with formaldehyde.
3. An electrode according to claim 1 wherein the electrically conductive base is porous graphite.

References Cited
UNITED STATES PATENTS 2,000,815  5/1935  Berl ............... 208—84
2,091,129  8/1937  Berl ............... 204—84

WILLIAM L. JARVIS, Primary Examiner

U.S. Cl. X.R.
117—121, 161